United States Patent Office 3,634,444
Patented Jan. 11, 1972

---

3,634,444
5-[BIS-(p-CHLOROPHENOXY)METHYL]-TETRAZOLE AND SALTS THEREOF
Ronald Leslie Buchanan, Fayetteville, N.Y., assignor to Bristol-Myers Company, New York, N.Y.
No Drawing. Filed Sept. 17, 1969, Ser. No. 858,859
Int. Cl. C07d 55/56
U.S. Cl. 260—308 D     3 Claims

ABSTRACT OF THE DISCLOSURE

The compound 5-[bis-(p-chlorophenoxy)methyl]-tetrazole and the pharmaceutically acceptable nontoxic salts thereof exhibits hypocholesterolemic activity and is useful as a hypocholesterolemic agent for the treatment of hypercholesterolemia in mammals, including man.

BACKGROUND OF THE INVENTION (1) Field of the invention

This invention relates to a novel compound which exhibits useful properties in the treatment of hypercholesterolemia.

(2) Description of the prior art

Many compounds are claimed in the prior art to be valuable in the treatment of hypercholesterolemia. The art most closely related is as follows:

(A) South African Pat. No. 67/4612, issued Aug. 1, 1967.

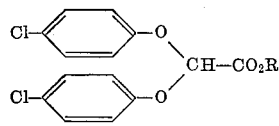

in which R is $—(CH_2)_nR^1$,

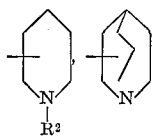

or a 2-dimethylamino-2-methylpropyl-1 radical, wherein $R^1$ is pyrrolidino, piperidino, morpholino, dialkylamino, anilino or a N-alkylanilino radical, or a radical of the formula

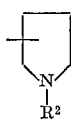

in which alkyl in the substituent signifies an alkyl radical having 1 to 4 carbon atoms, and $R^2$ signifies an alkyl radical having 1 to 4 carbon atoms, a phenyl radical, a phenylalkyl radical having 7 to 10 carbon atoms, or propargyl or β-(p-chlorophenoxy)-ethyl radical, and $n$ signifies a whole number from 2 to 4, and their acid addition salts and quaternary ammonium compounds. These compounds are taught as hypolipemic agents.

Also disclosed in this reference is the carboxylic acid having the formula

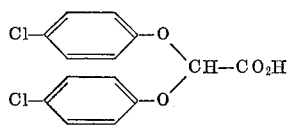

No activity is mentioned for this compound and it is only used as a chemical intermediate.

(B) French Pat. No. 1,540,403, issued Sept. 27, 1968.

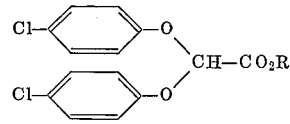

in which R is $C_3$ to $C_6$ alkyl. These compounds are described as hypochloesterolemics and appetite supressants.

(C) Canadian Pat. No. 791,185, issued July 30, 1968.

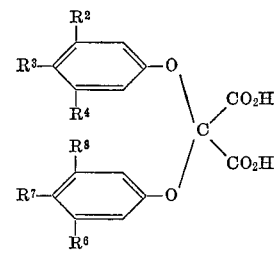

These compounds are described as hypolipemic agents.
(D) U.S. Pat. No. 3,337,576, issued Aug. 22, 1967.

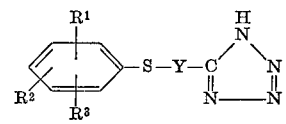

in which Y is (lower)alkylene, $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)alkoxy, nitro, phenyl, phenoxy and benzyl. The compounds are reported to be hypocholesterolemic agents.

SUMMARY OF THE INVENTION

The compound of the present invention is the compound having the formula

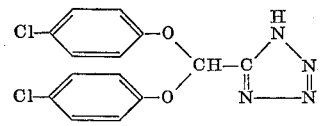

or a pharmaceutically acceptable nontoxic cationic salt thereof.

The compound, 5-[bis-(p-chlorophenoxy)methyl]-tetrazole, having the formula

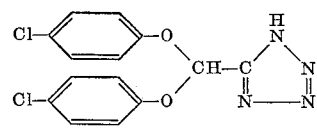

or a pharmaceutically acceptable nontoxic cationic salt thereof, is valuable for its hypocholesterolemic activity in mammals, including man.

The pharmaceutically acceptable nontoxic cationic salts include particularly the sodium and potassium salts. Such salts are prepared by conventional methods by reacting the acidic tetrazole with the desired base on about an equimolar basis.

The compound of the present invention is prepared according to the following reaction scheme:

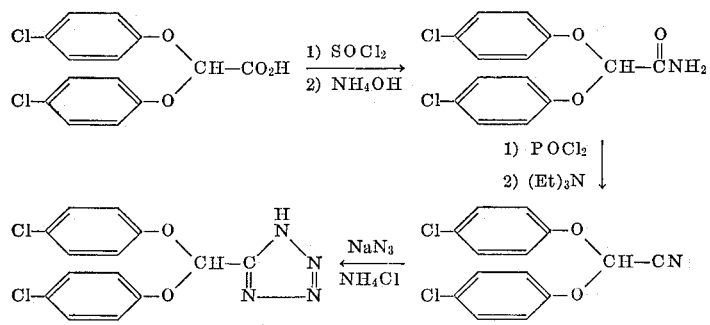

The compound of this invention has a high degree of cholesterol, triglyceride and phospholipid lowering activity, making it a potent hypolipemic agent which is useful for lowering serum cholesterol, triglyceride and phospholipid levels in mammals. Additionally the compound does not produce accumulation of cholesterol, desmosterol or 7-dehydrocholesterol in the liver.

Tests of the compound of this invention for cholesterol, triglyceride and phospholipid lowering activity were carried out by administering the compound (suspended in 0.5% carboxymethyl cellulose solution) p.o. to rats once daily for ten days. The control rats were tested similarly with the same volume dose of 0.5% carboxymethyl cellulose only. Starting the evening of the tenth day, the rats were fasted. On the eleventh day, the serum of the treated rats and control rats were analyzed for cholesterol, triglycerides and phospholipids and the cholesterol, triglycerides and phospholipids compared. The results are expressed as the percentage decrease in serum cholesterol, triglycerides and phospholipids.

In the test described above, 5-[bis-(p-chlorophenoxy)methyl]tetrazole having the formula

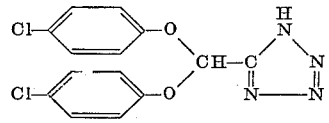

gave the following percentage decrease in serum cholesterol, triglycerides and phospholipids.

| | Percent | | |
|---|---|---|---|
| Oral dose (g./kg.) | Cholesterol | Triglycerides | Phospholipids |
| 200 | −76 | −78 | −64 |
| 100 | −51 | −46 | −41 |
| 50 | −37 | −44 | −28 |

The compound of this invention may be administered as the free tetrazole or in the form of its nontoxic cationic salts. It may be compounded and formulated into pharmaceutical preparations in units dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The compositions may take the form of tablets, powders, granules, capsules, suspensions, solutions, and the like and comprise not more than about 2000 mg. per dosage unit and preferably from about 50 to about 1000 mg. of the compound of this invention together with a suitable carrier.

The compound of this invention when administered orally or parenterally in an effective amount, i.e., a hypolipemic amount, is effective in lowering serum cholesterol, triglyceride and phospholipid levels in mammals. An oral dosage range of about 5 to about 100 milligrams per kilogram of body weight per day is useful for lowering serum cholesterol, triglyceride, and phospholipid levels in mammals, which may be administered in divided dosage, e.g., two, three or four times a day. Administration of the compound is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of serum cholesterol, triglyceride and phospholipid lowering effect required. After taking into consideration these factors and any other factors to be considered, one skilled in the art of treating diseases of mammals can readily determine the appropriate dosage.

DESCRIPTION OF THE PREFERRED
EMBODIMENTS.—EXAMPLE 1

Preparation of bis-(p-chlorophenoxy)acetic acid (a) Bis-(p-chlorophenoxy)acetic acid methyl ester.—A solution of 25.6 grams of 4-chlorophenol in 200 dimethylacetamide is slowly added to a stirring slurry of 9.5 grams of sodium hydride (56% in mineral oil) in 250 ml. of dimethylacetamide and the mixture stirred at 20° for one hour.

To the resulting clear solution are added 14.3 grams of methyl dichloroacetate in 200 ml. of dimethylacetamide and a catalytic amount of potassium iodide. The reaction mixture is stirred at 20° C. for seventeen hours and then poured over 1 liter of ice water. The mixture is then extracted with isopropyl ether. The separated ether layer is extracted with cold 1 N sodium hydroxide and the organic phase separated, dried over magnesium sulphate and evaporated to obtain a brown oil which crystallizes upon standing. Recrystallization of the resulting product from methanol yields bis-(p-chlorophenoxy)acetic acid methyl ester, M.P. 54.5–55.5° C.

(b) Bis-(p-chlorophenoxy)acetic acid.—The methyl ester from part A above was dissolved in a 3:1 mixture of ethanol-water and treated with a 10% molar excess of strong base such as sodium or potassium hydroxide at room temperature for about six hours. The solution was concentrated in vacuo, cooled and acidified with 6 N HCl and the oily residue extracted into ether. The ether solution was washed with water, dried over sodium sulfate, concentrated in vacuo and recrystallized from carbon tetrachloride, M.P. 137–140° C.

EXAMPLE 2

Preparation of 5-[bis-(p-chlorophenoxy)methyl]-
tetrazole (a) Bis-(p-chlorophenoxy)acetamide.—A mixture of bis-p-chlorophenoxy)acetic acid (16.3 grams, 0.052 mole) and thionyl chloride (150 ml.) was stirred and refluxed for three hours. After cooling the thionyl chloride was removed under reduced pressure with the aid of added benzene. The residual oil was then poured into 300 ml. of ice cold concentrated ammonium hydroxide solution. The resulting mixture was extracted with three portions of ether and the ether extracts were then washed successively with 5% sodium carbonate solution and water. Drying (anhydrous Na₂SO₄) and stripping of the solvent yielded 11.0 grams (67%) of the crude amide. Recrystallization from isopropyl alcohol afforded crystals, M.P. 96.5–98° C.

(b) Bis-(p-chlorophenoxy)acetonitrile.—Bis-(p-chlorophenoxy)acetamide (11.0 grams, 0.035 mole) was suspended in 100 ml. of redistilled phosphorus oxychloride. Triethylamine (7.2 grams, 0.071 mole) was added dropwise with stirring and the mixture was then heated at reflux for two hours. The excess POCl₃ was evaporated under reduced pressure and the residue was dissolved in chloroform. The chloroform solution was poured onto 150 grams of crushed ice and then basified by the addition of 6% sodium carbonate solution. The chloroform phase was separated and the aqueous phase was extracted with two additional portions of chloroform. The combined chloroform extracts were washed successively with 5% sodium carbonate solution and brine. Drying (anhydrous Na₂SO₄) and stripping afforded 12.2 grams of a dark oil. Distillation gave the desired nitrile (7.1 grams, 68.2%) in sufficiently pure form for further elaboration (B.P. 137–168° C. at 0.25 mm.). The infrared (IR) and nuclear magnetic resonance (NMR) spectra were consistent with the structure.

(c) 5 - [bis - (p - chlorophenoxy)methyl]tetrazole.—A mixture of bis-(p-chlorophenoxy)acetonitrile (5.76 grams, 0.02 mole), sodium azide (1.4 grams, 0.022 mole) and ammonium chloride (1.15 grams, 0.022 mole) in 125 ml. of dry dimethylformamide (DMF) was stirred and heated at 80–90° C. for sixteen hours. Most of the DMF was stripped off and the residue was suspended in water and acidified with concentrated hydrochloric acid. The mixture was extracted with three portions of chloroform and these extracts were then washed will brine and dried (anhydrous Na₂SO₄). Evaporation of the solvent yielded crude product which was then twice recrystallized from isopropyl alcohol-water. The white solid was dried at 78° under high vacuum to give the pure tetrazole (3.8 grams, 57.5% M.P. 139.5–141° C.). The IR and NMR spectra were consistent with the structure.

EXAMPLE 3

Sodium salt of 5-[bis-p-chlorophenoxy)methyl]-tetrazole

A methanol solution of a quantity of 5-[bis-(p-chlorophenoxy)methyl]tetrazole is stoichiometrically titrated with an anhydrous solution of sodium hydroxide dissolved in methanol. The resultant mixture is taken to dryness in vacuo, slurried and/or recrystallized from methanol or acetone, or a mixture thereof to produce the title compound.

I claim:
1. A compound having the formula

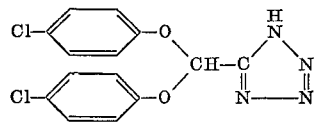

or a pharmaceutically acceptable cationic salt thereof.
2. The sodium salt of the compound of claim 1.
3. The potassium salt of the compound of claim 1.

References Cited

Brunet et al., Bull. Soc. Chim. France, 1964, pages 383–387.

ALTON D. ROLLINS, Primary Examiner

U.S. Cl. X.R.

260—465 B, 465 F; 424—269